July 10, 1945.　　　　　J. R. NEREAUX　　　　　2,379,984
SIMPLIFIED DRIVE FOR CUTTING TOOLS Filed July 16, 1943

INVENTOR
JOSEPH R. NEREAUX
BY
ATTORNEY

Patented July 10, 1945

2,379,984

UNITED STATES PATENT OFFICE 2,379,984

SIMPLIFIED DRIVE FOR CUTTING TOOLS

Joseph Richard Nereaux, Cincinnati, Ohio, assignor to Wright Aeronautical Corporation, a corporation of New York Application July 16, 1943, Serial No. 495,062

8 Claims. (Cl. 279—93)

This invention relates to a drive for a rotating cutting tool and is particularly concerned with a simplified drive for such a tool.

The principal object of this invention is to provide a drive for a rotating cutting tool which has a relative simplicity, sturdiness, and ease of manufacture as compared with the conventional practice. A further object of the invention is to provide a one-piece arbor for driving interchangeable cutting tools which arbor may be used either with righthand or lefthand cutting tools. A further object is to provide a drive for a rotating cutting tool in which the mating thrust surfaces may be ground, thereby assuring exact alinement and contact between the arbor and cutter. Another object is to provide a drive for a cutting tool in which the torque is transmitted to the tool close to the cutting edges of the tool. Further objects and advantages of this invention will become apparent in reading the annexed detailed description in connection with the drawing, in which:

Figure 1:
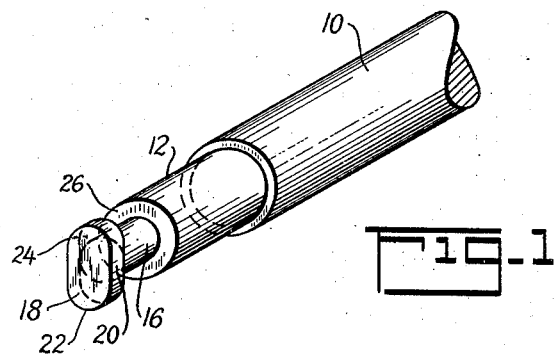
Fig. 1 is a perspective view of the arbor.

Referring to the drawing, the tool supporting end of the one-piece arbor 10 is illustrated in Fig. 1 and comprises a tool supporting cylindrical portion 12 for supporting the cutting tool 14. A reduced-diameter or neck portion 16 is provided adjacent the tool supporting portion 12 and an oblong-shaped head portion 18 is provided at the end of the arbor. The width of this oblong head 18 is preferably equal to the diameter of the neck portion 16 so that the flat sides 20 of the oblong head 18 are tangent to the surface of the neck portion 16. Also, the opposed ends 22 of the oblong head 16 preferably are made semi-cylindrical. The oblong head end of the arbor drives the cutter and in addition its rear face 24 acts as the axial thrust surface when a back spot-facer is being used. When a forward cutting tool is being used, the forward end surface 26 of the cylindrical portion 12 acts as the axial thrust surface, as hereinafter described.

Figures 2, 3:
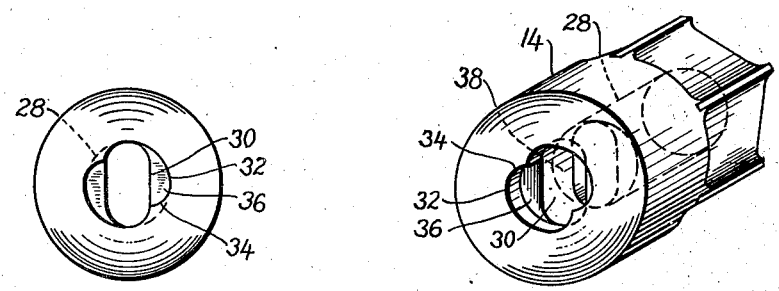
Fig. 2 is a perspective view of a cutting tool.
Fig. 3 is an end view of the tool.

The cutting tool 14, illustrated in Figs. 2 and 3, is a back spot-facer for use with the arbor 10. As illustrated, the cutting surfaces are conventional and the cutter is provided with a through opening which at one end consists of a cylindrical bore 28 fitted to receive the cylindrical portion 12 of the arbor. This cylindrical bore terminates in an oblong-shaped opening 30 through which the oblong head 18 of the arbor is adapted to pass as the arbor is received within the hollow cutting tool. This oblong-shaped opening 30 preferably is shaped to correspond to the contour of the oblong drive head 18. The end of the oblong-shaped opening 30 is provided with diametrically opposed cylindrical cut-out recesses 32. As illustrated, these recesses are such as to permit approximately a 90 degree relative rotation of the tool and arbor whereby the oblong head of the arbor drivably engages the ends 34 of the recesses. This construction provides strong and easily machined driving faces on the arbor and cutter, and at the same time retains the forward thrust surfaces 36, formed by the cut-out recesses 32, in contact with the thrust surface 24 of the oblong head 18. A cutter of opposite hand from that illustrated in Figs. 2 and 3 also may be used with the arbor illustrated in Fig. 1. However, if the cutter 14 were to be of opposite hand, the recesses 32 would be cut out in the reverse direction thereby providing a reverse drive for the cutter.

The arbor 10, illustrated in Fig. 1, may be used with either the back support-facer illustrated in Figs. 2 and 3 or with a forward cutting tool. When a forward cutting tool is being used, the axial thrust surface 38 formed at the junction of the cylindrical bore 28 and the oblong-shaped opening 30 engages the thrust surface 26 on the arbor.

The above described construction permits all thrust and driving surfaces to be ground thereby assuring exact alinement and contact between the arbor and cutters. In addition, because the driving surfaces 22 and 34 are close to the cutting edges of the tool, torsional twist of the tool is minimized. A further advantage is that the same arbor may be used for either righthand or lefthand cutters, may readily be hardened, and is less liable to crack at the point of driving because of the absence of sharp corners. Also, the fact that the arbor consists entirely of one piece and that no separate additional means are necessary to secure the cutting tool to the arbor, are further advantages of this invention.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. An arbor for drivably supporting a cutting tool comprising a cylindrical tool supporting portion about which said tool is adapted to be snugly received, a coaxial end portion of oblong cross-section having diametrically opposed curved end surfaces with intermediate flat side surfaces, the length of said oblong being no greater than the diameter of said cylindrical portion, and a coaxial, reduced-diameter intermediate portion having a diameter corresponding to the width of said end portion, said cylindrical tool-supporting portion having an axial length at least equal to the axial length of said end portion.

2. In combination, a cutting tool and a one-piece arbor for supporting and driving said tool, said arbor comprising a cylindrical tool supporting portion, an oblong-shaped end portion, and a reduced diameter intermediate portion, said tool having an opening for receiving said arbor, said opening comprising a cylindrical bore extending from one end and adapted to snugly receive the cylindrical portion of said arbor for supporting the tool thereabout, said cylindrical bore terminating in an oblong opening remote from said cylindrical bore shaped to permit passage of the end portion of the arbor, the end of said oblong-shaped opening having diametrically opposed cut-out recesses to permit a limited relative rotation of said tool and arbor after the arbor has been inserted within the tool whereby said arbor drivingly engages the cutting tool.

3. In combination, a cutting tool, and an arbor adapted to be drivably connected thereto, said arbor comprising a reduced-diameter neck portion between a non-circular driving head and a cylindrical portion, said tool having an opening for receiving the head, neck and cylindrical portion of said arbor in the sequence stated, said opening comprising a cylindrical bore within which said cylindrical portion is adapted to be snugly received for supporting said tool, the inner end of said cylindrical bore terminating in an opening of non-circular cross-section shaped to permit passage of said head and said neck portion, said non-circular opening having a peripheral recess axially spaced from said cylindrical bore, said recess being shaped to permit partial relative rotation of said tool and arbor with said driving head extending into said recess to releasably interlock and drivably connect said tool and arbor.

4. In combination, a cutting tool, and an arbor adapted to be drivably connected thereto, said arbor comprising a reduced-diameter cylindrical neck between a non-circular driving head and a tool supporting cylindrical portion having a diameter at least as large as the maximum transverse width of said head, said tool having an opening for receiving the head, cylindrical neck and cylindrical portion of said arbor in the sequence stated, said opening comprising a cylindrical bore within which said cylindrical portion is adapted to be snugly received for supporting said tool, and an opening of non-circular cross-section extending axially from the inner end of said cylindrical bore and shaped to permit passage of said head and neck, said non-circular opening having peripheral recesses axially spaced from said cylindrical bore, said recesses being shaped to permit partial relative rotation of said tool and arbor with said head extending into said recesses to releasably interlock and drivably connect said tool and arbor.

5. In combination, a cutting tool, an arbor adapted to be drivably connected thereto, said arbor comprising a reduced-diameter cylindrical neck between a driving head of oblong-shaped cross-section and a tool supporting cylindrical portion having a diameter at least as large as the transverse width of said oblong shaped head, said tool having an opening for receiving the head, cylindrical neck and cylindrical portion of said arbor in the sequence stated, said opening comprising a cylindrical bore within which said arbor cylindrical portion is adapted to be snugly received for supporting said tool, and an opening of oblong-shaped cross-section extending axially from the inner end of said cylindrical bore permitting passage of said head and neck, said oblong opening having diametrically opposed peripheral recesses axially spaced from said cylindrical bore, said recesses being shaped to permit partial relative rotation of said tool and arbor with said head extending into said recesses to releasably interlock and drivably connect said tool and arbor.

6. In combination, first and second members adapted to be drivably coupled together, said first member comprising a reduced-diameter neck portion between a non-circular driving head and a cylindrical portion having a diameter at least as large as the maximum transverse width of said head, said second member having an opening for receiving the head, neck and cylindrical portion of said first member in the sequence stated, said opening comprising a cylindrical bore at its entrance end within which said arbor cylindrical portion is adapted to be snugly received for supporting said tool, and an opening of non-circular cross-section extending axially from the inner end of said cylindrical bore and shaped to permit passage of the head and neck of said first member, said non-circular opening having a peripheral recess axially spaced from said cylindrical bore, said recess being shaped to permit partial relative rotation of said members with said head extending into said recess to releasably interlock and drivably connect said members.

7. A cutting tool having an opening adapted to receive an arbor for drivably supporting said tool, said opening comprising a cylindrical bore extending inwardly from one end of said tool, and an oblong-shaped opening extending inwardly from the inner end of said cylindrical bore, a portion of said oblong-shaped opening, axially spaced from said cylindrical bore, having a pair of diametrically opposed recesses corresponding to a partial rotation of said oblong-shaped portion.

8. A cutting tool having a cavity adapted to receive an arbor for drivably supporting said tool, said cavity comprising a cylindrical bore extending inwardly from an end of said tool, the inner end of said cylindrical bore terminating in a non-circular opening having a minimum width smaller than the diameter of said bore, and a portion of said non-circular opening spaced from said cylindrical bore being provided with one or more substantially coplanar peripheral recesses.

JOSEPH RICHARD NEREAUX.